US008670299B1

(12) United States Patent
Shukla et al.

(10) Patent No.: US 8,670,299 B1
(45) Date of Patent: Mar. 11, 2014

(54) ENHANCED SERVICE STATUS DETECTION AND FAULT ISOLATION WITHIN LAYER TWO NETWORKS

(75) Inventors: Pankaj Shukla, San Jose, CA (US); Sunesh Rustagi, San Jose, CA (US); Vikram Bobade, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 418 days.

(21) Appl. No.: 12/981,221

(22) Filed: Dec. 29, 2010

(51) Int. Cl.
*G01R 31/08* (2006.01)

(52) U.S. Cl.
USPC ............................ 370/216; 370/242; 370/245

(58) Field of Classification Search
USPC .................................................. 370/216, 345
See application file for complete search history.

(56) References Cited

U.S. PATENT DOCUMENTS

| 7,975,180 | B2* | 7/2011 | Sajassi et al. | 714/43 |
| 7,995,488 | B2* | 8/2011 | Ding et al. | 370/245 |
| 2010/0238791 | A1* | 9/2010 | Duncan et al. | 370/216 |

OTHER PUBLICATIONS

IEEE 802.1ag-2007, IEEE Standard for Local and metropolitan area networks—Virtual Bridged Local Area Networks Amendment 5: Connectivity Fault Management, Dec. 17, 2007, 259 pp.

International Telecommunications Union—Telecommunications (ITU-T) entitled Series Y: Global Information Infrastructure, Internet Protocol Aspects and Next-Generation Networks, OAM functions and mechanisms for Ethernet based networks, Y.1731, Feb. 2008, 81 pp.

* cited by examiner

*Primary Examiner* — Brandon Renner
(74) *Attorney, Agent, or Firm* — Shumaker & Sieffert, P.A.

(57) ABSTRACT

An example method includes monitoring a layer two network with a first network device that operates within the network. The method also includes discovering a second network device that operates within the network by receiving an extended continuity check message (CCM) transmitted from the second network device. The extended CCM transmitted from the second network device indicates to other network devices that a service instance is available on the second network device, and includes an indication of one or more network devices from which the second network device has received CCMs for the service instance. The method further includes determining that bidirectional connectivity exists between the first network device and the second network device when the indication includes the first network device as one of the network devices from which the second network device has received CCMs for the service instance.

30 Claims, 5 Drawing Sheets

ENHANCED SERVICE STATUS DETECTION AND FAULT ISOLATION WITHIN LAYER TWO NETWORKS

TECHNICAL FIELD

This document relates to computer networks, and more particularly, to maintenance of computer networks.

BACKGROUND

A computer network is a collection of interconnected computing devices that exchange data and share resources. In a packet-based network, such as the Internet, computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission. Computing devices may also divide data into other types of data units, such as cells or frames.

Networks that primarily utilize data link layer devices are often referred to as layer two (L2) networks. A data link layer device is a device that operates within the second layer of the Open Systems Interconnection (OSI) reference model, i.e., the data link layer. One example of a common L2 network is an Ethernet network in which end point devices (e.g., servers, printers, computers) are connected by one or more Ethernet switches. The Ethernet switches forward Ethernet frames, also referred to as L2 communications or L2 packets to devices within the network. As the Ethernet switches forward the Ethernet frames, the Ethernet switches learn L2 state information for the L2 network, including media access control (MAC) addressing information for the devices within the network and the physical ports through which the devices are reachable. The Ethernet switches typically store the MAC addressing information in MAC tables. When forwarding an individual Ethernet frame, an ingress port of an Ethernet switch typically broadcasts the Ethernet frame to all of the other physical ports of the switch unless the Ethernet switch has learned the specific physical port through which the destination MAC address devices is reachable. In this case, the Ethernet switch forwards a single copy of the Ethernet frame from the associated physical port.

Computing devices may be interconnected by one or more links. The term "link" is often used to refer to the connection between two devices on a network and may include a physical medium, such as a copper wire, a coaxial cable, or any of a host of different fiber optic lines, or a wireless connection. On occasion, one or more computing devices and/or one or more links of the network may fail due to any of a number of reasons. When a device or link of the network fails, the result is a degradation or loss of service to customers, which is generally undesirable. Administrators of networks often attempt to limit the impact of any such failures, e.g., by limiting the amount of time of the failure.

Operations, Administration and Maintenance (OAM) generally refers to processes, activities, tools, standards, and other techniques that involve operating, administering, and maintaining, e.g., troubleshooting, a computer network. A combination of OAM techniques may constitute an OAM protocol. One such OAM technique, referred to as Connectivity Fault Management (CFM), is described in the Institute of Electrical and Electronics Engineers (IEEE) 802.1 ag standard entitled "IEEE Standard for Local and Metropolitan Area Networks—Virtual Bridged Local Area Networks—Amendment 5: Connectivity Fault Management," which is hereby incorporated by reference. A network device operating in accordance with CFM may proactively transmit continuity check messages (CCMs) at a predetermined rate to other devices within the same maintenance association, and may receive CCMs from the other devices. A maintenance association is a logical grouping of devices within the network configured to verify the integrity of a single service instance. A service instance may, for example, represent a portion of a provider network that a given customer can access to query a status of services delivered for that customer. The CCMs provide unidirectional connectivity verification to the other network devices within the maintenance association.

The other network devices in the maintenance association may create and maintain a connectivity database of network devices from which periodic CCMs are expected to be received. The network devices may, after establishing connectivity with the other network devices, monitor receipt of CCMs. If a CCM is not received from one of the network devices identified in the connectivity database within a configured time, the network device may identify a fault or a failure, which is commonly referred to as a "connectivity failure."

SUMMARY

Techniques are described that provide enhanced service status detection and fault isolation in layer two (L2) networks. The techniques allow L2 switches to guarantee bidirectional connectivity prior to data traffic switching. That is, as described herein, the techniques may be applied by L2 switches within the network in accordance with an enhanced neighbor discovery protocol so that each of the L2 switches can be assured not only that any discovered neighboring switches can be reached (i.e., unidirectional connectivity), but that communications can be received from those switches (i.e., bidirectional connectivity).

For example, with 802.1ag protocols, continuity check messages (CCMs) have traditionally been used to provide neighbor discovery by indicating to other L2 devices that a particular service instance is available on a source L2 device that sends the CCM. When another L2 device receives the CCM from the source device, receipt of the message signifies to the remote device that a service from the source device to the remote device is operative. However, receipt of the CCM does not signify to the remote device that the service from the remote device back to the source device is also operative. Similarly, when the source device receives a CCM sent from the remote device, it signifies to the source device that the service from the remote device to the source device is operative, but it does not signify to the source device that the service from the source device back to the remote device is also operative. In other words, the transmission and reception of conventional CCMs for discovery purposes only ensure unidirectional connectivity between network devices. As such, conventional CCMs for L2 device discovery cannot be utilized to ensure bidirectional connectivity between a source device and a remote device.

Conventional CCMs also cannot be used to isolate connectivity faults between network devices in a multipoint to multipoint network. In the context of a multipoint to multipoint network, when a device in the network fails to receive an expected CCM from another device, the device that expected to receive the CCM may raise a fault notification, such as a remote defect indicator (RDI), which can then be sent to the other devices. Although the RDI indicates that a connectivity fault has occurred somewhere in the network, as observed by the device that raises the RDI, the RDI does not uniquely identify the location of the fault. As such, remote devices receiving an RDI are aware that a fault occurred, but cannot uniquely identify the point of the failure based solely on the information contained in the RDI.

In accordance with the techniques of this disclosure, extended continuity check messages (CCMs) may be utilized to provide enhanced service status detection and fault isolation for devices operating in a network. As described herein, CCMs may be extended to include not only information that a particular service instance is available on a network device as described above, but also to include information about other remote devices in the network that the network device has "learned." In this context, "learning" a remote device means that the network device has received one or more CCMs from the remote device, thereby establishing at least one-way connectivity between the network device and the remote device—namely, connectivity from the remote device to the network device. In the context of this disclosure, a "learned" device may also be referred to as a "known" device.

The additional information contained in the extended CCMs may be used to enhance service status detection between two network devices by allowing a local device that receives an extended CCM to determine whether bidirectional connectivity exists between the local device and the remote device from which the extended CCM was sent. For example, when the local device receives an extended CCM from the remote device that indicates that the remote device has learned the local device, then the local device is assured that there is bidirectional connectivity between itself and the remote device because receipt of the CCM assures connectivity from the remote device to the local device, and the information in the extended CCM that the remote device has learned the local device assures connectivity from the local device to the remote device. In some implementations, when bidirectional connectivity is determined to have been established, the local device may enable network traffic communication to be sent to the remote device.

Similarly, if the local device receives an extended CCM from the remote device that does not include such an indication, then the local device can determine that the remote device has not learned the local device. In this case, although unidirectional connectivity exists from the remote device to the local device, bidirectional connectivity does not exist because connectivity has not been established from the local device to the remote device. Bidirectional connectivity may not exist between the local device and the remote device in cases where such connectivity has yet to be established, or in cases where bidirectional connectivity was established at some point, but where the bidirectional connectivity was subsequently lost for any of a number of reasons, such as a fault in the network. In some implementations, when bidirectional connectivity is determined not to exist between the local device and the remote device, the local device may disable network traffic communication from being sent to the remote device until such time as bidirectional connectivity has been established or reestablished.

According to the techniques described in this disclosure, the additional information contained in the extended CCMs may also be used to uniquely identify an endpoint of connectivity failure in a multipoint to multipoint network. In particular, because the extended CCM sent from a network device includes information about the remote devices that the network device has learned, a remote device receiving the extended CCM can determine whether the service from the remote device to the network device either has not been established or is otherwise faulty based on the information in the extended CCM. As such, unlike an RDI that merely indicates that there is a faulty connection somewhere on the network, if the extended CCM sent from the network device does not indicate that a particular remote device is known, then the connectivity fault may be uniquely identified as the service from the particular remote device to the network device. By uniquely identifying the point of connectivity failure, administrators of a network utilizing extended CCMs as described in this disclosure may be able to identify and correct connectivity failures more quickly, thereby improving the service provided to customers of the network.

In one example implementation, the techniques of this disclosure may be applied using an OAM protocol executing on provider edge (PE) routers in a network, where the OAM protocol sends periodic CCMs that have been extended as described herein to other PE routers to provide enhanced service status detection and fault isolation. The PE routers may use an extended OAM protocol not only for connectivity checks and conventional network maintenance, but also to transparently embed information with respect to known remote maintenance association end points (MEPs) that are associated with remote PE routers. This embedded information may be utilized, for example, to allow the PE routers to determine whether bidirectional connectivity exists between two of the PE routers, and to uniquely identify any connectivity failures between the various PE routers on the network. As one example, such information may be used by the PE router to enable or disable network communications to one or more other PE routers. In another example, a PE router may flush one or more MAC addresses learned over a link—e.g., the PE router may flush the MAC addresses that are reachable through an L2 connection with a particular PE router in response to detecting a connectivity fault in the network between the PE router and the particular PE router—based on the information included in the extended CCMs. In this manner, the PE router can prevent traffic loss by services operating over the network.

In a first aspect, a method includes monitoring a layer two network with a first network device that operates within the network. The method further includes discovering a second network device that operates within the network by receiving, with the first network device, an extended continuity check message transmitted from the second network device. The extended continuity check message transmitted from the second network device indicates to other network devices that a service instance is available on the second network device, and includes an indication of one or more network devices from which the second network device has received continuity check messages for the service instance. The method further includes determining that bidirectional connectivity exists between the first network device and the second network device when the indication includes the first network device as one of the one or more network devices from which the second network device has received continuity check messages for the service instance. In some implementations, the method also includes enabling network traffic communication from the first network device to the second network device after determining that bidirectional connectivity exists between the first network device and the second network device.

In a second aspect, a network device includes a plurality of physical network interfaces configured to send and receive network data. The device further includes a control unit coupled to the plurality of physical network interfaces. The control unit includes a maintenance association end point (MEP) module that monitors a layer two network in which the network device operates. The control unit discovers a second network device that operates within the network by receiving, via one of the plurality of physical network interfaces, an extended continuity check message transmitted from the second network device. The extended continuity check message transmitted from the second network device indicates to other network devices that a service instance is available on the second network device, and includes an indication of one or more network devices from which the second network device has received continuity check messages for the service instance. The MEP module determines that bidirectional connectivity exists between the network device and the second network device when the indication includes the network device as one of the one or more network devices from which the second network device has received continuity check messages for the service instance. In some implementations, the control unit enables network traffic communication from the network device to the second network device after the MEP module determines that bidirectional connectivity exists between the network device and the second network device.

In a third aspect, a computer-readable storage medium is encoded with instructions that cause one or more programmable processors to monitor a layer two network with a first network device that operates within the network. The computer-readable storage medium further includes instructions that cause one or more programmable processors to discover a second network device that operates within the network by receiving, with the first network device, an extended continuity check message transmitted from the second network device. The extended continuity check message transmitted from the second network device indicates to other network devices that a service instance is available on the second network device, and includes an indication of one or more network devices from which the second network device has received continuity check messages for the service instance. The computer-readable storage medium further includes instructions that cause one or more programmable processors to determine that bidirectional connectivity exists between the first network device and the second network device when the indication includes the first network device as one of the one or more network devices from which the second network device has received continuity check messages for the service instance. In some implementations, the computer-readable storage medium further includes instructions that cause one or more programmable processors to enable network traffic communication from the first network device to the second network device after determining that bidirectional connectivity exists between the first network device and the second network device.

The details of one or more embodiments are set forth in the accompanying drawings and the description below. Other features, objects, and advantages will be apparent from the description and drawings, and from the claims.

DETAILED DESCRIPTION

Figure 1:
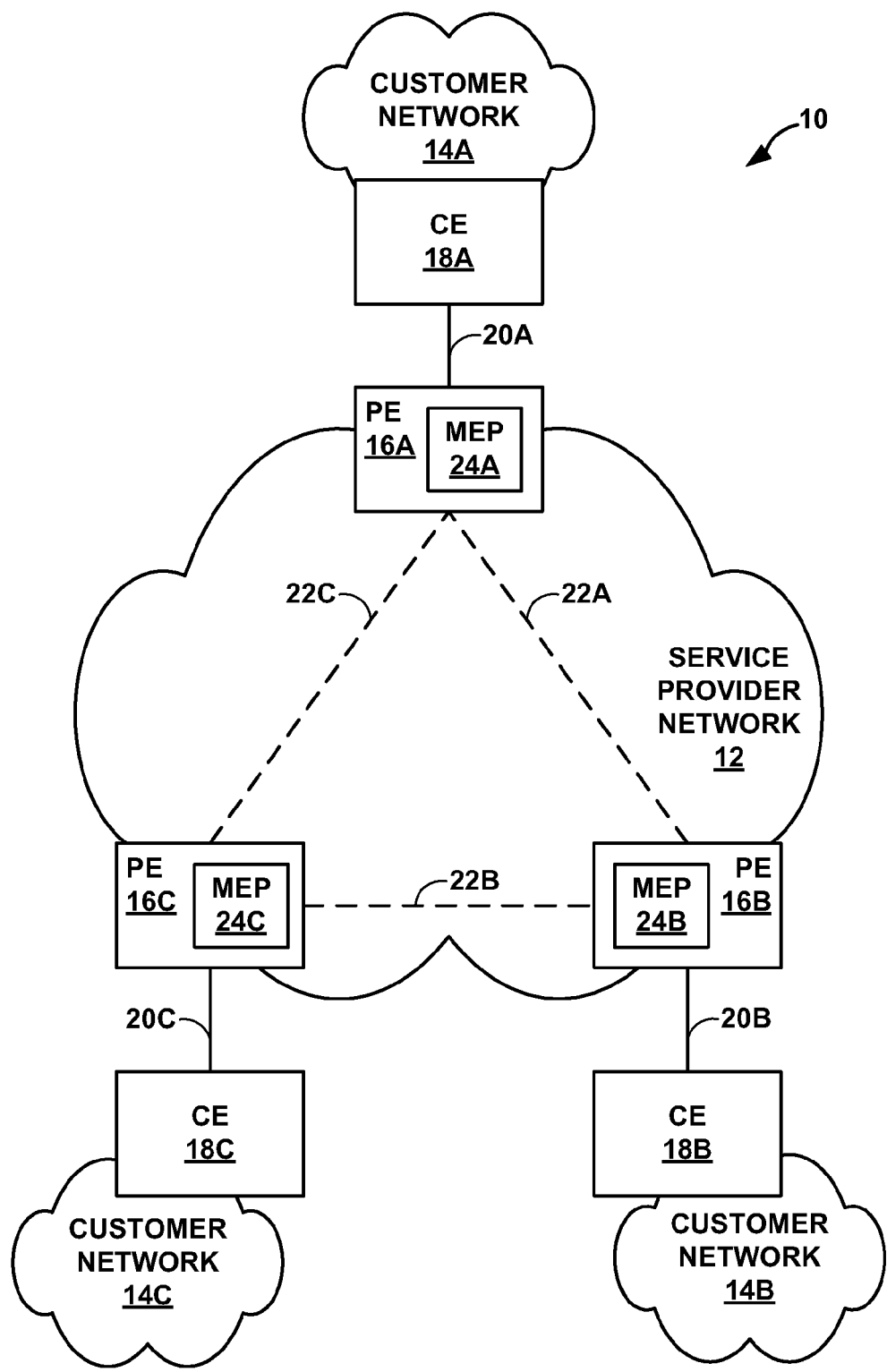
FIG. 1 is a block diagram illustrating an example network system in which one or more network devices perform techniques described in this disclosure.

FIG. 1 is a block diagram illustrating an example network system 10 in which one or more network devices perform techniques described in this disclosure. Network system 10 includes a network 12 and customer networks 14A-14C ("customer networks 14"). Network 12 may represent a public network that is owned and operated by a service provider to interconnect a plurality of edge networks, such as customer networks 14. Network 12 may be referred to herein as a service provider network or, alternatively, as a "core network" considering that network 12 acts as a core to interconnect edge networks, such as customer networks 14.

Service providers may lease portions of network 12 or provide services offering interconnection through network 12 to customer networks 14, which may lease the portions or purchase the services provided by network 12. For example, network 12 may offer a Virtual Private Large Area Network (LAN) Service (VPLS) to virtually interconnect various layer 2 or data link layer networks. Reference to layers followed by a numeral may refer to a particular layer of the Open Systems Interconnection (OSI) model. VPLS may transparently interconnect these layer 2 networks, e.g., customer networks 14, to one another via network 12. Network 12 may provide VPLS by transparently emulating a direct connection between various customer networks 14 such that, from the perspective of customer networks 14, each of customer networks 14 appears to directly connect to one another.

Customer networks 14 may each represent a network owned and operated by an entity, such as a university, corporation, business, or other facility or enterprise. In some instances, a single large entity may own and operate two or more of customer networks 14. The entity may then contract with a service provider to purchase a service offered by service provider network 12, such as VPLS, in order to transparently interconnect customer networks 14 in the manner described above.

Each of customer networks 14 may operate according to a wide variety of network protocols, such as any of the 802.3x family of network protocols related to the Ethernet protocol, any of the 802.1x family of wireless networking protocols, an Internet Protocol (IP), an Asynchronous Transfer Mode (ATM) protocol, or a Transmission Control Protocol (TCP). Moreover, one or more of customer networks 14 may comprise a Virtual Private Network (VPN), a Large Area Network (LAN), or a Wide Area Network (WAN). Although not shown in FIG. 1 for clarity of illustration purposes, each of customer networks 14 may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection.

Network 12 may include a plurality of provider edge (PE) routers 16A-16C ("PEs 16") that reside at an edge of service provider network 12, hence the name "provider edge" routers. While discussed herein with respect to a particular network device, i.e., a router, PEs 16 may each represent any network device that interfaces with a network, such as one of customer networks 14, to route, switch, or otherwise forward network traffic directed to or originating from the network. For example, PEs 16 may each represent, in certain instances, one or more of a router, a switch, a hub, a bridge device (e.g., an Ethernet bridge), and the like.

Each of customer networks 14 may include a respective one of a plurality of customer edge (CE) routers 18A-18C ("CEs 18") that reside at an edge of the corresponding one of customer networks 14, hence the name "customer edge" routers. Like PEs 16, CEs 18, while discussed herein with respect to a particular network device, i.e., a router, may each represent any network device that interfaces with a network, such as service provider network 12, to route, switch, or otherwise forward network traffic directed to or originating from the network. For example, CEs 18 may each represent, in certain instances, one or more of a router, a switch, a hub, a bridge device (e.g., an Ethernet bridge), and the like.

PEs 16 may couple to a respective one of CEs 18 via network links 20A-20C ("links 20"). PEs 16 may provide one or more services, such as the above described VPLS, to transparently interconnect CEs 18 to one another. To continue the above example, a large entity may own and operate each of customer networks 14 and purchase from service provider network 12 a VPLS or other service, such as a Virtual Private Network (VPN) service, to transparently interconnect each of the customer networks 14 to one another. In this instance, PE 16A may emulate a direct connection in accordance with the purchased service to both of customer networks 14B, 14C such that CE 18A may operate as if it directly connects to both CE 18B and CE 18C. Likewise, PE 16B may emulate a direct connection in accordance with the purchased service to both of customer networks 14A, 14C such that CE 18B may operate as if it directly connects to both CE 18A and CE 18C. Additionally, PE 16C may emulate a direct connection in accordance with the purchased service to both of customer networks 14A, 14B such that CE 18C may operate as if it directly connects to both CE 18A and CE 18B.

This form of interconnection is referred to as "full mesh" in that each of a set of customer networks 14 interconnect with every other one of the set of customer networks 14. The full mesh form of interconnection is illustrated in FIG. 1 as three bi-directional virtual links 22A-22C ("virtual links 22") that couple PEs 16 to one another. Virtual links 22 are illustrated in FIG. 1 as dashed lines to reflect that these links 22 may not directly couple PEs 16 to one another, but may represent one or more physical links and intermediate network devices that form each of virtual links 22. While assumed for ease of illustration purposes to be configured in this full mesh manner, customer networks 14 may interconnect with one another via any other form of interconnection, and virtual links 22 may be bi-directional or unidirectional to suit a particularly desired form of interconnection.

An administrator of service provider network 12 may configure the purchased service to establish virtual links 22, and once established, PEs 16 may begin emulating the direct connection between CEs 18 via virtual links 22. CEs 18 may receive network traffic from their respective customer networks 14 and forward this network traffic via respective physical links 20 to corresponding PEs 16. PEs 16 may then transparently forward the network traffic through service provider network 12 via virtual links 22 in accordance with the purchased service. PEs 16 may then deliver the network traffic to the other ones of CEs 18 via physical links 20, whereupon CEs 18 may forward the traffic to their respective customer networks 14. In this manner, a large entity may purchase a service from service provider network 12 to interconnect disparate and often geographically separate customer networks 14.

To facilitate maintenance of the interconnection of customer networks 14, one or more of PEs 16, and/or one or more of CEs 18 may implement Operations, Administration, and Maintenance (OAM) techniques, such as Connectivity Fault Management (CFM) as described in the IEEE 802.1ag standard. CFM may generally enable discovery and verification of a path through network devices and networks taken by data units, e.g., frames or packets, addressed to and from specified network users, e.g., customer networks 14. Typically, CFM is directed to fault management within layer 2 networks, such as Ethernet networks, otherwise referred to as Large Area Networks (LANs), and layer 2 services, such as VPLS. While described herein with respect to layer 2 networks and services and the layer 2-centric CFM, the techniques may be employed to facilitate enhanced service status detection and fault isolation between network devices, e.g., PEs 16, for networks and services provided with respect to other layers, e.g., layer 3, of the OSI model.

CFM generally provides a set of protocols by which to perform fault management. One protocol of the CFM set of protocols, referred to as a "continuity check protocol," may involve a periodic transmission of continuity check messages (CCMs) to determine, verify, or otherwise check continuity between two endpoints. More information regarding CFM in general and the CFM set of protocols, including the continuity check protocol, can be found in an Institute of Electrical and Electronics Engineers (IEEE) draft standard, titled "Virtual Bridged Local Area Networks—Amendment 5: Connectivity Fault Management," by the LAN/MAN Standards Committee, dated Jun. 18, 2007, which is herein incorporated by reference in its entirety.

In accordance with CFM, one or more users or administrators of network 12 or customer networks 14 may establish various abstractions useful for managing maintenance operations. For example, the administrators may establish a Maintenance Domain (MD) specifying those of PEs 16 or CEs 18 that support CFM maintenance operations. In other words, the MD specifies the network or part of the network for which faults in connectivity may be managed. The administrator may, in establishing or defining the MD, assign a maintenance domain name to the MD, which represents a MD identifier that uniquely identifies a particular MD.

The administrators may further sub-divide the MD into one or more Maintenance Associations (MA). An MA is a logical grouping that generally comprises a set of those PEs or CEs included within the MD and is established to verify the integrity of a single service instance. A service instance may, for example, represent a portion of a provider network that a given customer can access to query a status of services delivered for that customer.

For purposes of illustration, it may be assumed here that the administrators have configured an MA to include each of PEs 16. To establish the MA, the administrators may configure a Maintenance association End Point (MEP) 24A-24C ("MEPs 24") within each one of PEs 16. While shown as including a single MEP 24, PEs 16 may include a plurality of MEPs 24, such as one MEP for each of a plurality of service instances. MEPs 24 may each represent an actively managed CFM entity that generates and receives CMF Payload Data Units (PDUs), e.g., the CCM PDUs shown in FIG. 3, and tracks any responses. Each of MEPs 24 represents an endpoint of the same MA.

The administrators may, when establishing the MA, also define an MA IDentifier (MAID) and an MD level. The MAID may comprise an identifier that uniquely identifies the MA within the MD. The MAID may comprise two parts, the MD name assigned to the MD in which the MA resides and an MA name. The MD level may comprise an integer or other value identifying an abstract layer or portion of the MD to which the MA is associated. In other words, the MD level may segment the MD into levels at which one or more MAs may reside. The administrators may then, when configuring MEPs 24, associate MEPs 24 to the MA by configuring each of MEPs 24 with the same MA identifier and the same MD level. In this respect, the MA comprises the set of MEPs 24, each configured within the same MAID and MD level, established to verify the integrity of a single service instance.

Once configured in this manner, MEPs 24 may each detect both connectivity failures and unintended connectivity between service instances. Each of MEPs 24 may periodically transmit a Connectivity Check Message (CCM) announcing the identity and configured MA level of the transmitting one of MEPs 24. MEPs 24 may multicast this message to each of the other MEPs 24 included within the same MA level. Each of MEPs 24 may track the CCMs received from the other MEPs 24 to determine connectivity faults and unintentional connectivity. For example, MEPs 24 may detect a connectivity fault by determining, based on received CCMs, a list of connected MEPs and comparing this list to a list of those MEPs within the same MA level. If the list of connected MEPs includes less MEPs than those expected or configured within each of MEPs 24, then MEPs 24 may determine that one or more of MEPs 24 lack a desired connectivity.

In other words, MEPs 24 may each be configured with one or more other MEPs 24 with which it expects to exchange, e.g., transmit and receive, CCMs. MEPs 24 may then proceed to exchange CCMs according to how each of MEPs 24 is configured. MEPs 24 may generate a list or otherwise track CCMs after each exchange to determine those of MEPs 24 to which it is currently connected. If one of MEPs 24 did not receive an expected CCM, for example, that one of MEPs 24 may generate a list lacking one of MEPs 24. Upon comparing this connectivity list to the expected list, this one of MEPs 24 may determine that one of MEPs 24 is not currently connected. For example, in the 802.1ag protocol suite, a loss of three consecutive CCMs is considered a loss of connectivity. In this manner, MEPs 24 may periodically determine whether each of MEPs 24 of the same MA are currently interconnected with one another, and thereby periodically evaluate connectivity.

As another example, MEPs 24 may detect a connectivity fault based on a loss of received CCMs. In some instances, each of MEPs 24 may maintain a threshold by which to determine whether a connectivity fault occurs. Each of MEPs 24 may maintain a single threshold or one threshold for each of the other MEPs 24. The threshold may be configurable by an administrator or may be dynamically set by the MEPs 24 based on observed network characteristics, such as a determined available bandwidth. In any case, MEPs 24 may monitor receipt of CCMs from each of the other ones of MEPs 24. MEPs 24 may determine a length or interval of time between receipt of successive CCMs from the same one of MEPs 24 and compare this interval to the threshold if only one threshold is maintained, or the corresponding one of the plurality of thresholds in instances where the MEP maintains a threshold for each MEP. If the interval exceeds the threshold, the one of MEPs 24 determines that one of MEPs 24 lack a desired connectivity. If the interval does not exceed the threshold, the one of MEPs 24 determines that the other one of MEPs 24 is connected.

In some instances, each of MEPs 24 may implement the plurality of thresholds as a timer that is continually reset upon receipt of a CCM from a respective one of MEPs 24. In these instances, each of MEPs 24 may reset the timer to the threshold value upon receipt of a CCM from a corresponding one of MEPs 24. The threshold value may be configurable by an administrator or dynamically determined based on a determined network characteristic, e.g., available bandwidth. If the timer reaches zero, the MEP may determine that a corresponding one of MEPs 24 lacks the desired connectivity. While a number of examples are described herein by which to determine a connectivity fault, the techniques of this disclosure should not be limited to any one of the above examples. Instead, the techniques described herein may be implemented by a network device to detect a fault in any manner.

MEPs 24 may execute the continuity check protocol to automatically, e.g., without any administrator or other user oversight after the initial configuration, exchange these CCMs according to a configured or, in some instances, set period. For example, CCMs may be sent, based on a particular configuration, every ten milliseconds, one hundred milliseconds, one second, ten seconds, one minute, or the like. MEPs 24 may implement the continuity check protocol to perform fault detection. Upon detecting a lack of connectivity or connectivity fault, the administrator or other user, such as an Internet Technology (IT) specialist, may troubleshoot the fault using appropriate troubleshooting methods or protocols.

The functionality of CCMs described above may further be enhanced by extending the CCMs to include not only information that a particular service instance is available on a network device as described above, but also to include information about other remote devices in the network that the network device has learned. For example, as described above, MEPs 24 may generate a list or otherwise track CCMs after each exchange to determine those of MEPs 24 to which it is currently connected (e.g., the remote MEPs from which the MEP has received CCMs or as otherwise determined as described above). This list or collection of remote MEPs may then be included in CCMs sent from the network device. As one example, the list or collection of remote MEPs may be included in a type-length-value (TLV) field of the CCM. A CCM that includes such additional information may be referred to herein as an extended CCM.

Extended CCMs may then be used to enhance service status detection between two network devices by allowing a device that receives an extended CCM to determine whether bidirectional connectivity exists between that device and the remote device from which the extended CCM was sent. For example, when the local device receives an extended CCM from the remote device that indicates that the remote device has learned the local device, then the local device is assured that there is bidirectional connectivity between itself and the remote device because receipt of the CCM assures connectivity from the remote device to the local device, and the information in the extended CCM that the remote device has learned the local device assures connectivity from the local device to the remote device. In some implementations, when bidirectional connectivity is determined to have been established, the local device may enable network traffic communication to be sent to the remote device.

Similarly, if the local device receives an extended CCM from the remote device that does not include such an indication, then the local device can determine that the remote device has not learned the local device. In this case, although unidirectional connectivity exists from the remote device to the local device, bidirectional connectivity does not exist because the service from the local device to the remote device is not operative. There may be any number of reasons for bidirectional connectivity to not exist between the local device and the remote device. For example, bidirectional connectivity may not exist in cases where such connectivity has yet to be established between the two devices. As another example, bidirectional connectivity may have been established at some point, but was subsequently lost for any of a number of reasons, such as a fault in the network.

When bidirectional connectivity is determined not to exist between the local device and the remote device, the local device may perform one or more programmed responses. For example, in some implementations, the local device may disable network traffic communication from being sent to the remote device until such time as bidirectional connectivity has been established or reestablished. In addition, or alternatively, the local device may remove one or more media access control (MAC) addresses that are reachable through an L2 connection to the remote device from a collection of MAC addresses stored on the local device. In some implementations, the local device may also raise an alarm or notification that may be communicated to an administrator of the network. The alarm or notification may be presented, for example, via a user interface, e-mail, text message, website, or other similar means of communication. The administrator may then interact with the appropriate network devices to troubleshoot the connectivity between two or more network devices.

In some implementations, when bidirectional connectivity is determined to have been broken, e.g., when bidirectional connectivity existed at one point but has been subsequently lost, the information contained in the extended CCMs may be used to uniquely identify a point of connectivity failure in a multipoint to multipoint network. In particular, because the extended CCM sent from a remote device includes information about the devices that the remote device has learned, a network device receiving the extended CCM can determine whether the service from the network device to the remote device is faulty based on the information in the extended CCM. For example, if the extended CCM sent from the remote device does not indicate that the network device is known, then the connectivity fault may be uniquely identified as the service from the network device to the remote device. By uniquely identifying the point of connectivity failure, administrators of a network utilizing extended CCMs as described in this disclosure may be able to identify and correct such failures more quickly, thereby improving the service provided to customers of the network.

The techniques of this disclosure may be implemented by PEs 16 of FIG. 1. PEs 16 may execute an OAM protocol that sends periodic CCMs that have been extended as described herein to other PEs 16 to provide enhanced service status detection and fault isolation. PEs 16 may use the extended OAM protocol not only for connectivity checks and conventional network maintenance, but also to transparently embed information with respect to known remote maintenance association end points (MEPs 24) that are associated with remote PEs 16. This embedded information may be utilized, for example, to allow PEs 16 to determine whether bidirectional connectivity exists between two of PEs 16, and to uniquely identify any connectivity failures between the various PEs on the network. As one example, such information may be used by one of PEs 16, e.g., PE 16A, to enable or disable network communications to one or more other PEs 16, e.g., PE 16B. In another example, PE 16A may flush one or more MAC addresses learned over a link—e.g., PE 16A may flush the MAC addresses reachable through an L2 connection to PE 16B in response to detecting a connectivity fault in the network between PE 16A and PE 16B—based on the information included in the extended CCMs. In this manner, PEs 16 can prevent traffic loss by services operating over the network.

Although described with respect to PEs 16, the techniques of this disclosure may be implemented by one or more other network devices in various implementations. For example, CEs 18 may also be configured to include one or more MEPs, and may utilize the techniques of this disclosure to provide enhanced service status detection and fault isolation amongst CEs 18.

Figure 2:
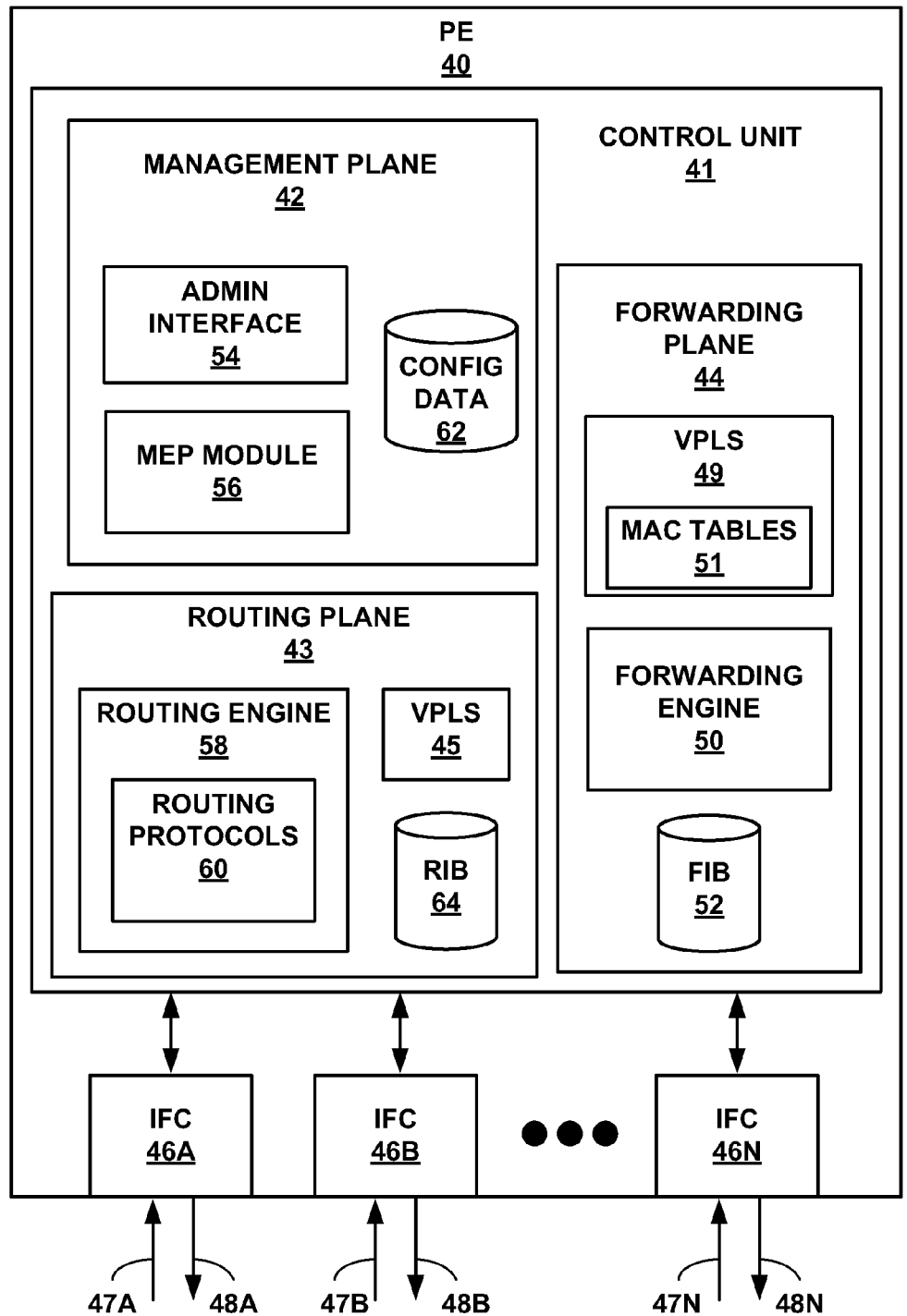
FIG. 2 is a block diagram illustrating an example provider edge (PE) router that implements techniques described in this disclosure.

FIG. 2 is a block diagram illustrating an exemplary PE router 40 that may implement the techniques in this disclosure. For purposes of illustration, PE router 40 may be described below within the context of exemplary network 12 of FIG. 1 and may represent any one of PEs 16. However, it should be understood that the techniques described below could also be applied using an L2 switch or other L2 network device. PE router 40 includes network interface cards 46A-46N (collectively, "IFCs 46") that receive control packets and data packets via inbound links 47A-47N (collectively, "inbound links 47") and send control packets and data packets via outbound links 48A-48N (collectively, "outbound links 48"). IFCs 46 are typically coupled to links 47, 48 via a number of interface ports. PE router 40 includes a routing plane 43 that determines routes of received packets and a forwarding plane 44 that forwards the packets accordingly via IFCs 46.

Control unit 41 may include one or more processors (not shown) that execute software instructions, such as those used to define a software or computer program, stored in a computer-readable storage medium (not shown). Examples of computer-readable storage media include a storage device (e.g., a disk drive, or an optical drive), or memory (such as Flash memory or random access memory) or any other type of volatile or non-volatile memory, that stores instructions to cause a programmable processor to perform the techniques described herein. Alternatively, or in addition, control unit 41 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 41 may be logically separated into management plane 42, routing plane 43, and forwarding plane 44. Routing plane 43 includes VPLS module 45, routing engine 58, and routing information base ("RIB") 64. Routing engine 58 may comprise any suitable combination of hardware and software, which performs the routing functions of PE router 40, such as calculating packet routes and executing routing protocols 60 to maintain routing tables. Routing engine 58 maintains routing information in RIB 64 that describes the topology of a network and, in particular, routes through the network. RIB 64 may include, for example, route data that describes various routes within the network, and corresponding next-hop data indicating appropriate neighboring devices within the network for each of the routes.

VPLS module 45 of routing plane 43 provides L2 connectivity over an IP/MPLS network as if remote networks (e.g., customer networks 14) were directly coupled by L2 switches. As such, VPLS module 45 may perform L2 learning, e.g., learning of customer device MAC addresses from inbound pseudowires (PWs) and association of those customer MAC addresses with corresponding outbound PWs and output interfaces. VPLS module 45 may maintain location tables for each VPLS instance established by PE router 40. The learning processes may alternatively occur within forwarding plane 44.

Routing plane 43 provides an operating environment for executing routing protocols 60. Routing protocols 60 typically establish peer communication sessions with other routing devices to exchange routing information stored in RIB 64, thereby learning the topology of the network and, more specifically, routes to other network devices within the network. Routing protocols 60 may include exterior routing protocols, such as exterior BGP (eBGP), to exchange routing information with routers of other routing domains or autonomous systems. Additionally, or alternatively, routing protocols 60 may include interior routing protocols, such as interior BGP (iBGP), Routing Information Protocol (RIP), Interior Gateway Routing Protocol (IGRP), Open Shortest Path First (OSPF), or Intermediate System to Intermediate System (IS-IS), to learn of routes to destinations within the same routing domain or autonomous system as PE router 40.

Routing engine 58 further generates forwarding information that associates destination information, such as IP address prefixes, with specific forwarding next-hops and corresponding interfaces ports of IFCs 46, and provides the forwarding information to forwarding plane 44. The forwarding information may be determined based on the information stored in RIB 64 as well as configuration information stored configuration data 62.

Forwarding plane 44 may include any combination of hardware and/or software, which performs forwarding functions of the PE router 40, such as packet validation, route lookup, and delivery. In some examples, forwarding plane 44 is distributed in whole or in part to the IFCs 46 in order to perform the requisite forwarding functions on incoming packets in parallel. Forwarding information of FIB 52 associates network destinations with specific next-hops and corresponding interface ports. Forwarding plane 44 also includes forwarding engine 50, which processes packets in accordance with FIB 52.

Forwarding plane 44 includes a VPLS module 49 capable of communicating with VPLS module 45. VPLS module 44 maintains MAC tables 51 and forwarding information 52 for each VPLS established by PE router 40. For example, VPLS module 49 maintains MAC tables 51 to reflect state information learned via layer 2 communications.

In general, PE router 40 provides L2 switching behavior between L2 interfaces (e.g., Ethernet) and pseudowires over an MPLS network. For example, when PE router 40 receives an MPLS packet on a pseudowire via one of inbound links 47 for a given VPLS instance, forwarding plane 44 extracts the encapsulated L2 data frame and performs L2 switching in accordance with the appropriate MAC tables 51. For example, forwarding plane 44 may switch the L2 frame to a specific interface when the destination MAC address of the L2 frame has been previously learned. Otherwise, forwarding plane 44 may flood the L2 frame to all interfaces associated with the VPLS instance. For outbound L2 connectivity, VPLS module 49 receives L2 data frames from a local L2 network, encapsulates the L2 data frames to form MPLS packets and forwards the MPLS packets along an appropriate pseudowire in accordance with FIB 52. PE router 40 may also provide L3 routing functions by processing L3 packets to identify an associated next hop for the packet in accordance with forwarding information stored in FIB 52. In one example, forwarding engine 50 examines the forwarding information stored in FIB 52 and performs a lookup based on the packet's header information.

VPLS module 49 included in forwarding plane 44 performs MAC address learning to update MAC tables 51 for each VPLS instance established by PE router 40. For example, VPLS module 49 may store a MAC table 51 for each L2 interface and for each logical interface associated with a VPLS pseudowire, where the MAC tables record MAC addresses of devices reachable through those interfaces. In effect, PE router 40, an L3 device, learns associations between MAC address and pseudowires (which are mapped to ports), much as a L2 switch learns associations between MAC addresses and ports. Forwarding information 52 may represent a virtual port binding and bridging table. In this sense, the router is acting as a virtual L2 switch to provide VPLS service.

In some cases, VPLS module 45 in routing plane 43 may assist in performing L2 learning and association of L2 customer MAC addresses with specific PWs based on updates received from forwarding plane 44 when providing L2 switching functionality. VPLS module 45 then communicates updated information that is associated with the VPLS instance to VPLS module 49 in forwarding plane 44. In this way, VPLS module 49 may be programmed with associations between each PW and output interface and specific source customer MAC addresses reachable via those PWs. VPLS module 49 updates the one of MAC tables 51 associated with the VPLS to associate the customer MAC addresses with the appropriate outbound PW. After the update, the one of MAC tables 51 associated with this particular VPLS instance records associations between the PWs connected to PE router 40 that are used to transport L2 traffic to the MAC addresses of the customer devices within the VPLS sites of the VPLS instance. In other words, the one of MAC tables 51 for this VPLS instance records associations between the PWs and the network devices to which data packets may be sent on the PWs. For example, the one of MAC tables 51 records PW numbers that identify the PWs sourced by PE router 40, and for those PW numbers identifies the MAC addresses of the reachable customer devices within the VPLS instance.

Management plane 42 includes administrator interface 54, and MEP module 56. MEP module 56 represents an exemplary instance of a management endpoint in accordance with the 802.1 ag standard or, more generally, an instance of an OAM protocol executing within control unit 41. That is, MEP module 56 generates CCMs and examines CCMs received from MEPs executing within other network devices, e.g., from any of the other PEs 16.

An operator may interact with administrator interface 54 to direct MEP module 56 to perform CFM operations to perform enhanced service status detection and to isolate faults within a network in accordance with the techniques of this disclosure. For example, an administrator may enter commands to view and modify configuration data 62 to automatically generate CCMs at specified times, e.g., once every five seconds or once per minute. The current configuration of PE router 40 may be stored as configuration data 62. The configuration information of configuration data 62 may include information such as maintenance domain information, maintenance association information, and CCM generation intervals, for example. Configuration data 62, RIB 64, and FIB 52 may be stored in the form of one or more tables, databases, linked lists, radix trees, or other suitable data structure.

MEP module 56 may manage MEP functionality for PE router 40 in its role as a MEP in one or a plurality of service instances. MEP module 56 examines received CCMs and generates and sends CCMs in accordance with configuration data 62, e.g., at configurable intervals and to particular ones of PE routers associated with a particular service instance.

In accordance with the techniques of this disclosure, MEP module 56 may maintain a list or collection of remote MEPs from which PE router 40 has received CCMs. For example, MEP module 56 may maintain a collection of MEP identifiers associated with the one or more network devices from which PE router 40 has received CCMs. When MEP module 56 receives a CCM from a network device that is not currently in the collection, the MEP identifier associated with the newly discovered network device may be added to the collection. Similarly, when MEP module 56 determines that it is no longer receiving CCMs from a network device that is already included in the collection, the MEP identifier associated with that network device may be removed from the collection. In some implementations, a single missed CCM may cause the removal of the network device from the collection. In other implementations, timing thresholds, missed CCM thresholds, or other techniques as described in greater detail above may be used to determine whether a remote MEP should be removed from the collection. The collection of remote MEPs that are maintained by MEP module 56 may be stored in memory of PE router 40, and may be utilized to generate extended CCMs to be sent to other network devices within the MA.

When generating an extended CCM to be sent to other network devices, MEP module 56 may transparently embed the collection of MEP identifiers into the extended CCM, such that the extended CCM relays information to the other network devices about which network devices PE router 40 has learned. The collection of MEP identifiers may be included in one or more TLVs or TLV fields of the extended CCM.

Upon receiving an extended CCM from another device on the network, PE router 40 may use the information from the extended CCM to provide enhanced service status detection and fault isolation as described herein. For example, based on the information in the extended CCM, PE router 40 may determine whether bidirectional connectivity exists between PE router 40 and the remote device that transmitted the extended CCM. If the collection of remote MEPs included in the TLV of the extended CCM includes a MEP identifier associated with PE router 40, then bidirectional connectivity exists between the two devices. Conversely, if the collection of remote MEPs does not include a MEP identifier associated with PE router 40, then bidirectional connectivity does not exist between the two devices because the remote MEP is not receiving CCMs from PE router 40.

After determining whether bidirectional connectivity exists between PE router 40 and the remote network device, PE router 40 may perform a configurable programmed response. For example, if bidirectional connectivity is determined to exist, PE router 40 may enable network traffic communication to be sent to the remote network device. While PE router 40 continues to receive extended CCMs indicating that PE router 40 is known to the remote network device, PE router 40 may continue allowing network traffic to be sent to the remote network device.

On the other hand, if bidirectional connectivity is determined not to exist, PE router 40 may disable network traffic communication from being sent to the remote device until such time as bidirectional connectivity has been established or reestablished. In addition, or alternatively, PE router 40 may remove one or more MAC addresses that are reachable through an L2 connection to the remote device from a collection of MAC addresses stored on PE router 40. In some implementations, PE router 40 may also raise an alarm or notification that may be communicated to an administrator of the network.

In some implementations, when bidirectional connectivity is determined to have been broken, e.g., when bidirectional connectivity existed at one point but has been subsequently lost, the information contained in the extended CCMs may be used to uniquely identify an endpoint of connectivity failure in a multipoint to multipoint network. For example, if the extended CCM sent from the remote device does not indicate that PE router 40 is known to the remote device, then PE router 40 may uniquely identify the connectivity fault as the logical link from PE router 40 to the remote device. By uniquely identifying the point of connectivity failure, administrators of a network utilizing extended CCMs may be able to identify and correct such failures more quickly, thereby improving the service provided to customers of the network.

Figure 3:
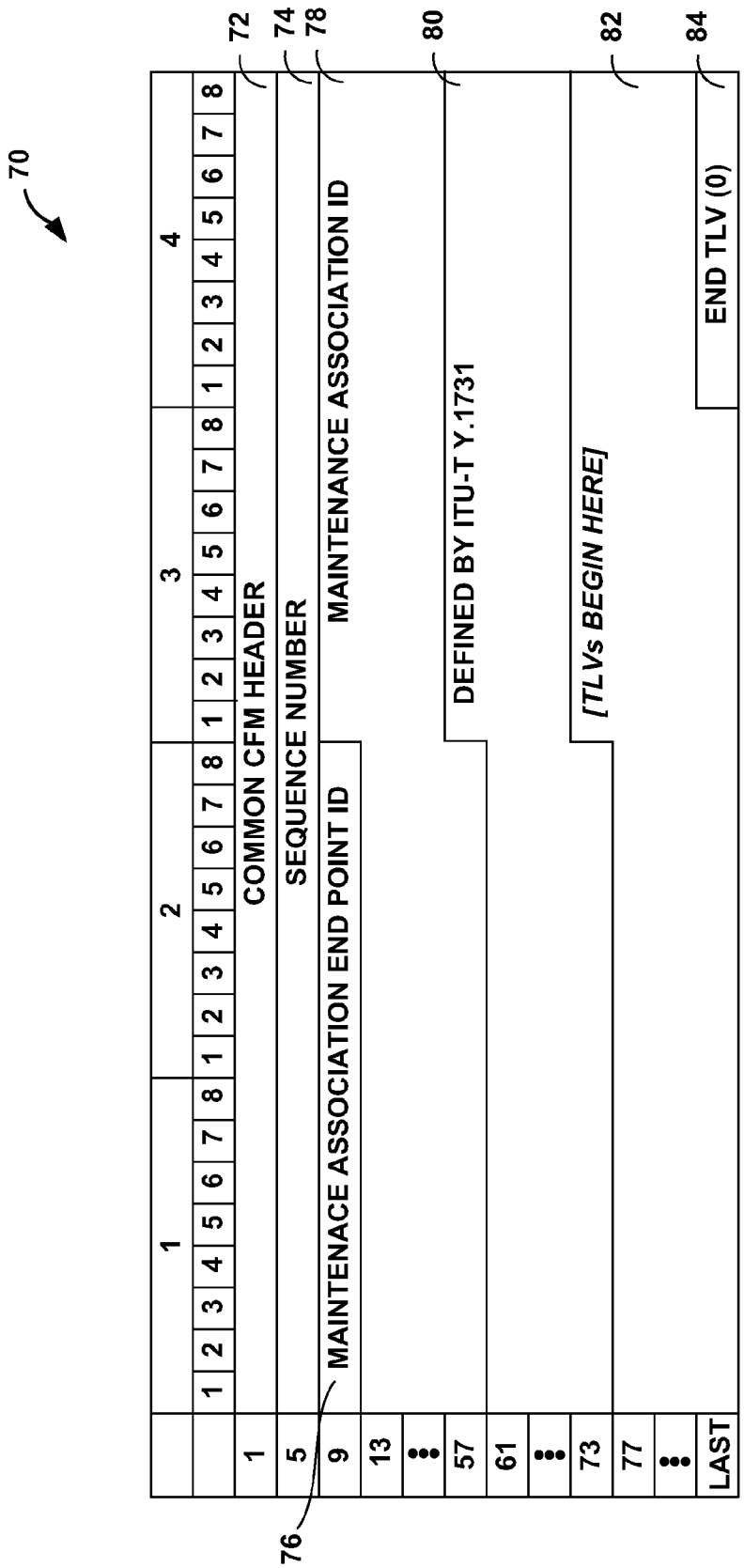
FIG. 3 is a block diagram illustrating an example continuity check message (CCM) protocol data unit (PDU) format configured to carry information that can be used to communicate network errors.

FIG. 3 is an example continuity check message (CCM) protocol data unit (PDU) 70 consistent with this disclosure. CCM PDU 70 includes a common Connectivity Fault Management (CFM) header 72, sequence number field 74, maintenance association end point identifier (MEP ID) 76, maintenance association ID (MAID) 78, standards-based information 80, a type-length-value ("TLV") field 82, and an end TLV field 84. The common CFM header 72 includes fields that specify the maintenance domain level, version, a code that specifies the format and meaning of the remainder of the PDU, and flags that include the CCM interval, the first TLV offset, and an end TLV. Standards-based information 80 includes the $59^{th}$ through $74^{th}$ octets of the CCM PDU, which are defined by International Telecommunications Union-Telecommunications (ITU-T) entitled SERIES Y: GLOBAL INFORMATION INFRASTRUCTURE, INTERNET PROTOCOL ASPECTS AND NEXT-GENERATION NETWORKS, OAM functions and mechanisms for Ethernet based networks, Y.1731, February 2008, the entire content of which is herein incorporated by reference. TLV field 82 is an optional element of CCM PDU 70 that may be utilized herein to provide an extension to CCM PDU 70 in accordance with the techniques of this disclosure. TLV field 82 is described further with respect to FIGS. 4A and 4B.

Figure 4A:
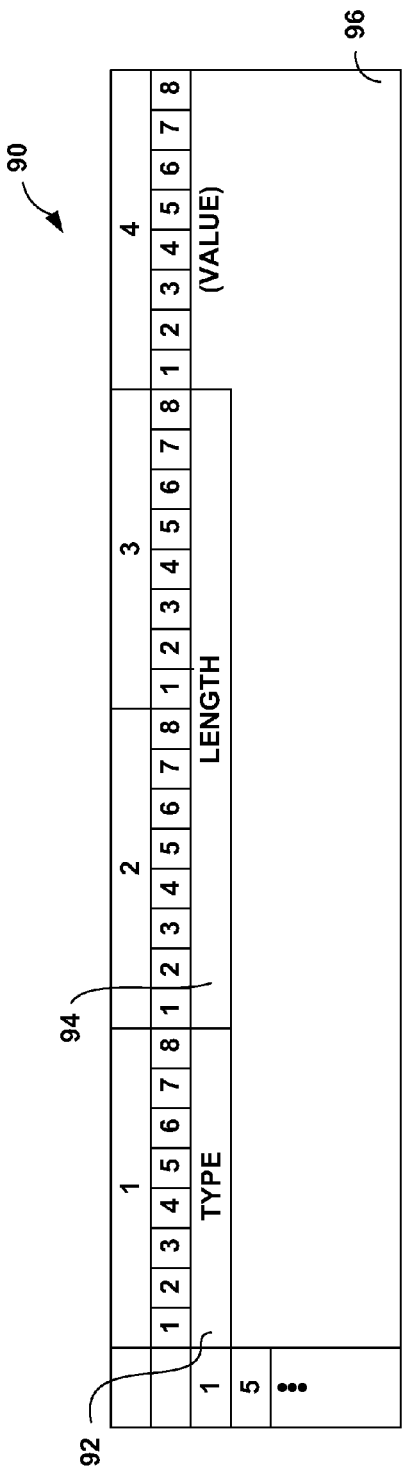
FIGS. 4A and 4B are block diagrams illustrating example formats of a type-length-value (TLV) that may be included within an extended CCM PDU.
Figure 4B:
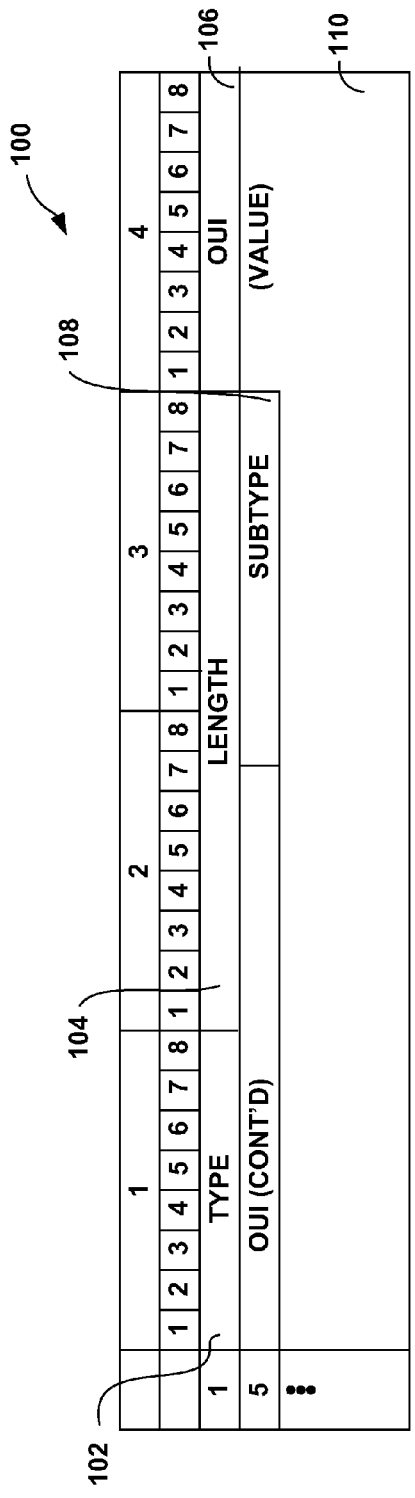

FIGS. 4A and 4B are example formats of a TLV that may be included within a CCM PDU, e.g., CCM PDU 70 of FIG. 3. TLV 90 of FIG. 4A is an example of the format defined by the 802.1ag standard for a TLV having a type that is included in the 802.1ag standard. TLV 90 includes type field 92, length field 94, and value field 96. Type field 92 is a required element of a TLV, which identifies the type of the TLV, and may be a one-octet field. For example, if type field 92 is set to the value one, the TLV is identified as a sender ID TLV. As another example, if type field 92 is set to the value zero, the TLV is identified as an end TLV. When type field 92 is set to the value zero, length field 94 and value field 96 are not present in the TLV. If type field 92 is set to a value other than zero, length field 94 is present and indicates the size of value field 96 in octets. Value field 96 is an optional element that includes the number of octets required to store the information as specified in length field 94. If length field 94 is set to the value zero, value field 96 is not present.

In accordance with this disclosure, the CCM protocol may be extended to include a remote MEP TLV that includes a collection of all remote MEPs with which a local MEP is connected. In other words, the collection includes a list of remote MEPs from which the local MEP is currently receiving CCMs, which signifies that the service from the remote MEP to the local MEP is operational. In the remote MEP TLV, a value for type field 92 may be defined to identify the TLV as a remote MEP TLV. In accordance with this disclosure, network devices, e.g., PEs 16 operating as MEPs 24, are configured to generate and send or receive and process CCMs consistent with the format illustrated by CCM PDU 70 and TLV 90 to notify other network devices within the MA of the remote MEPs to which a local MEP is connected.

Although not currently defined as part of a CCM protocol standard, a remote MEP TLV, once defined, may include a value for type field 92 that is defined to identify the TLV as a remote MEP TLV. Length field 94 of the remote MEP TLV may be defined as a function of the number of remote MEPs a network device has learned, and may correspond to a size of value field 96 that can accommodate all of the remote MEP identifiers that are known to the network device. For example, if remote MEP identifiers can each be stored using a certain amount of memory (e.g., two bytes), then the value of length field 94 may be equal to the number of MEP identifiers multiplied by the memory storage size of each remote MEP identifier. Then, value field 96 may include all of the remote MEP identifiers that are known to the network device, either serially or in some other standardized format that allows a network device to identify which MEP identifiers are included in the remote MEP TLV.

In some implementations, particularly if remote MEP TLVs are not defined as part of a CCM protocol standard, a remote MEP TLV may be defined as an organization-specific TLV. Referring to FIG. 4B, TLV 100 is an example of an organization-specific TLV 100. Organization-specific TLV 100 includes type field 102, length field 104, and value field 110, similar to these fields described above with respect to TLV 90. For organization-specific TLVs, type field 102 is set to the value thirty-one. Organization-specific TLV 100 also includes organizational unique identifier ("OUI") field 106 and subtype field 108. Length field 104 is set to the total length, in octets, of OUI field 106, subtype field 108, and value field 110. OUI field 106 includes a unique identifier assigned to each organization by the IEEE. Subtype field 108 identifies a type of TLV as defined by the organization identified in OUI field 106. Each organization may identify one or more TLV subtypes. The combination of OUI field 106 and subtype field 108 uniquely identifies the type of the TLV.

PEs 16 may generate the remote MEP TLVs described with respect to FIG. 4A as organization-specific TLVs, e.g., TLV 100. When generating remote MEP TLVs as organization-specific TLVs, subtype field 108 is set to a value, determined by the organization identified in OUI field 106, that identifies the organization-specific TLV as a remote MEP TLV. The values of value field 110 for the remote MEP TLV may be set to values that include the collection of remote MEPs in a similar manner as described above with respect to TLV 90.

Figure 5:
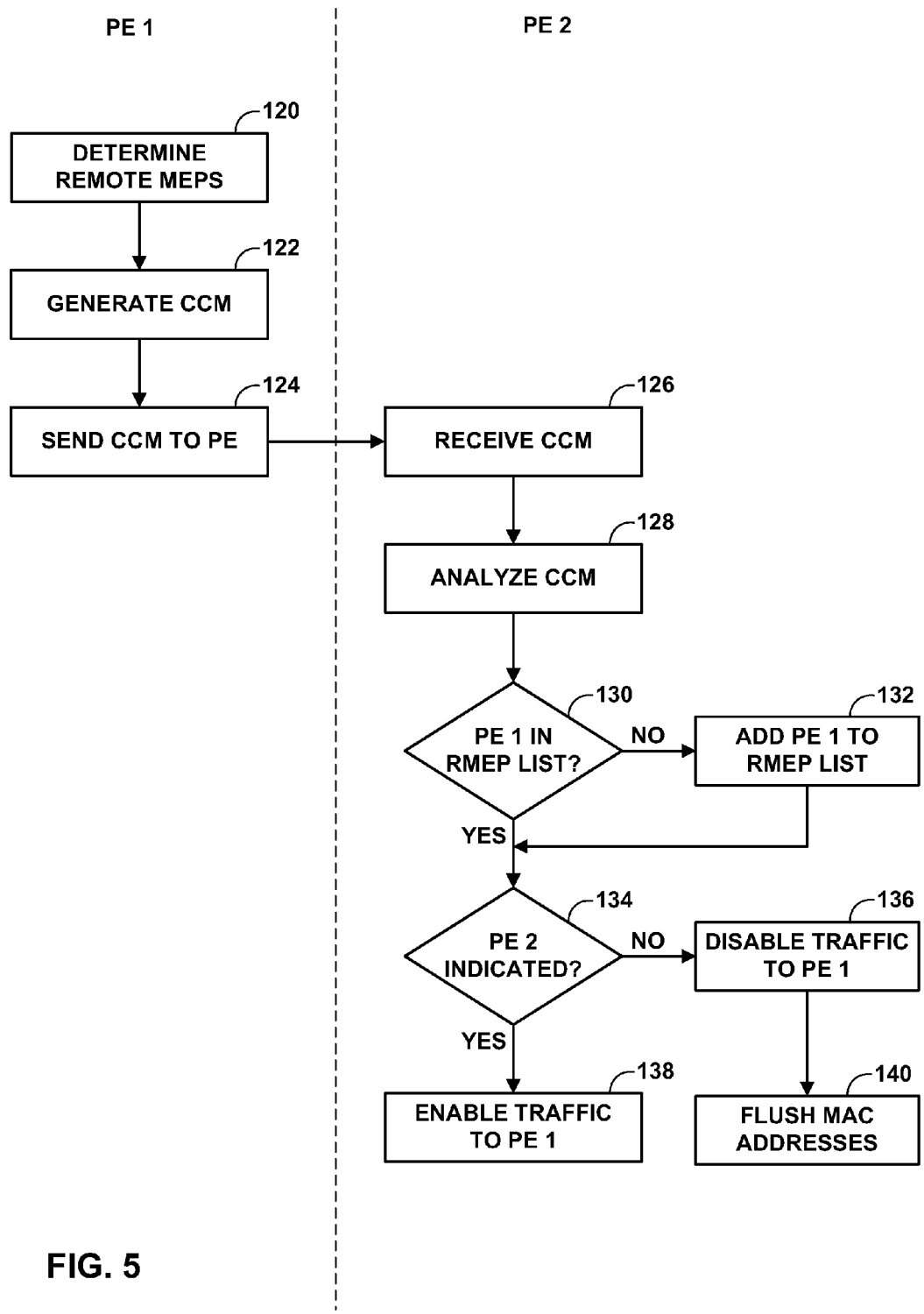
FIG. 5 is a flowchart illustrating an example operation of network devices implementing techniques described in this disclosure.

FIG. 5 is a flowchart illustrating an example operation of network devices implementing the techniques described in this disclosure. For purposes of clarity, FIG. 5 is described with respect to a first PE (PE 1) and a second PE (PE 2) operating on the same network, e.g., PEs 16A and 16B operating on network 12 as shown in FIG. 1. However, it should be understood that other network devices may also implement the techniques described herein.

In the example operation, PE 16A first performs device discovery by identifying the remote MEPs from which it has received CCMs (120). In some implementations, a remote MEP is learned when PE 16A receives a first CCM from the remote MEP announcing that a service instance associated with the remote MEP is available on the network. As described above, PE 16A may continuously or periodically monitor and maintain the collection of remote MEPs that PE 16A has learned to determine whether PE 16A has learned any new remote MEPs, or if any of the learned remote MEPs have subsequently been disconnected from PE 16A.

After determining the remote MEPs, PE 16A generates an extended CCM (122), e.g., by generating CCM PDU 70 that includes a remote MEP TLV as illustrated by FIGS. 4A and 4B. When generating an extended CCM to be sent to other network devices, PE 16A may transparently embed the collection of MEP identifiers into the extended CCM, such that the extended CCM relays information to the other network devices about which network devices PE 16A has learned. PE 16A then sends the generated extended CCM to PE 16B via one of IFCs 46 and outbound links 48 (124). In some implementations, PE 16A may be configured to periodically generate extended CCMs to be transmitted to remote PEs (e.g., every 10 milliseconds, every 100 milliseconds, every second, etc.). PE 16B receives the extended CCM via one of IFCs 46 and inbound links 47 (126) and analyzes the received extended CCM (128). PE 16B may be configured to determine whether it has learned PE 16A by comparing a collection of learned remote MEPs to the MEP identifier associated with PE 16A (130). If PE 16B has not yet learned PE 16A, then PE 16A is learned and added to the list of remote MEPs that PE 16B has learned (132). In such a manner, PE 16B may maintain a collection of remote MEPs that PE 16B has learned.

PE 16B may also be configured to determine whether PE 16B has been learned by PE 16A based on the information included in the extended CCM received from PE 16A (134). If PE 16B has been learned by PE 16A, i.e., if there is an indication in the extended CCM that PE 16A has learned PE 16B, then it can be determined that bidirectional connectivity exists between PE 16A and PE 16B. For example, if PE 16B is indicated in the TLV of the extended CCM, then such an indication signifies that PE 16A has received CCMs from PE 16B, and as such, the service from PE 16B to PE 16A is operative. Furthermore, receipt of the extended CCM by PE 16B signifies that the service from PE 16A to PE 16B is operative. If PE 16B is indicated as having been learned by PE 16A, then PE 16B may enable network traffic to be sent to PE 16A (138).

Conversely, if PE 16B is not indicated in the TLV of the extended CCM, then the lack of such an indication signifies that PE 16A has not learned PE 16B, or is no longer receiving CCMs from PE 16B, and as such, that the service from PE 16B to PE 16A is not operative. Therefore, PE 16B can determine that bidirectional connectivity does not exist between PE 16A and PE 16B. In such a case, PE 16B may disable network traffic from being sent to PE 16A (136). In some implementations, PE 16B may disable network traffic from being sent to PE 16A until such time as bidirectional connectivity has been established or reestablished. In addition, PE 16B may flush one or more MAC addresses that are reachable through an L2 connection to PE 16A from a collection of MAC addresses stored on PE 16B (140).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various embodiments have been described. These and other embodiments are within the scope of the following claims.

What is claimed is:

1. A method comprising:
   monitoring a layer two network with a first network device that operates within the network;
   discovering a second network device that operates within the network by receiving, with the first network device, an extended continuity check message transmitted from the second network device, wherein the extended continuity check message transmitted from the second network device indicates to other network devices that a service instance is available on the second network device, and wherein the extended continuity check message includes an indication of one or more network devices from which the second network device has received continuity check messages for the service instance; and
   determining that bidirectional connectivity exists between the first network device and the second network device when the indication includes the first network device as one of the one or more network devices from which the second network device has received continuity check messages for the service instance.

2. The method of claim 1, wherein the indication comprises a collection of maintenance association end point (MEP) identifiers associated with the one or more network devices from which the second network device has received continuity check messages for the service instance, and wherein bidirectional connectivity exists between the first network device and the second network device when a MEP identifier associated with the first network device is included in the collection.

3. The method of claim 1, further comprising enabling network traffic communication from the first network device to the second network device after determining that bidirectional connectivity exists between the first network device and the second network device.

4. The method of claim 1, wherein the indication is included in one or more type-length-value (TLV) fields of the extended continuity check message transmitted from the second network device.

5. The method of claim 1, further comprising:
   receiving, after determining that bidirectional connectivity exists between the first network device and the second network device, a subsequent extended continuity check message transmitted from the second network device;
   determining that bidirectional connectivity no longer exists between the first network device and the second network device when an indication in the subsequent extended continuity check message transmitted from the second network device does not include the first network device as one of the one or more network devices from which the second network device has received continuity check messages for the service instance; and
   after determining that bidirectional connectivity no longer exists between the first network device and the second network device, disabling network traffic communication from the first network device to the second network device.

6. The method of claim 1, further comprising:
   after receiving the extended continuity check message transmitted from the second network device:
      including a maintenance association end point (MEP) identifier associated with the second network device in a collection of MEP identifiers associated with network devices from which the first network device has received continuity check messages for the service instance;
      generating an extended continuity check message associated with the first network device that includes the collection of MEP identifiers in one or more type-length-value (TLV) fields; and
      transmitting the extended continuity check message associated with the first network device from the first network device.

7. The method of claim 6, further comprising removing the MEP identifier associated with the second network device from the collection of MEP identifiers after determining that bidirectional connectivity no longer exists between the first network device and the second network device.

8. The method of claim 7, further comprising removing one or more media access control (MAC) addresses that are reachable through the second network device from a collection of MAC addresses stored on the first network device after determining that bidirectional connectivity no longer exists between the first network device and the second network device.

9. The method of claim 1, further comprising:
   receiving an extended continuity check message transmitted from a third network device;
   determining that bidirectional connectivity does not exist between the first network device and the third network device when an indication in the extended continuity check message transmitted from the third network device does not include the first network device as one of the one or more network devices from which the third network device has received continuity check messages for the service instance; and after determining that bidirectional connectivity does not exist between the first network device and the third network device, disabling network traffic communication from the first network device to the third network device.

10. The method of claim 1, further comprising identifying a point of connectivity failure based at least in part on the indication.

11. A network device comprising:
a plurality of physical network interfaces configured to send and receive network data; and
a control unit coupled to the plurality of physical network interfaces, the control unit comprising a processor and maintenance association end point (MEP) software executing on the processor to monitor a layer two network in which the network device operates,
wherein the control unit discovers a second network device that operates within the network by receiving, via one of the plurality of physical network interfaces, an extended continuity check message transmitted from the second network device, wherein the extended continuity check message transmitted from the second network device indicates to other network devices that a service instance is available on the second network device, and wherein the extended continuity check message includes an indication of one or more network devices from which the second network device has received continuity check messages for the service instance, and
wherein the MEP software determines that bidirectional connectivity exists between the network device and the second network device when the indication includes the network device as one of the one or more network devices from which the second network device has received continuity check messages for the service instance.

12. The network device of claim 11, wherein the indication comprises a collection of MEP identifiers associated with the one or more network devices from which the second network device has received continuity check messages for the service instance, and wherein bidirectional connectivity exists between the network device and the second network device when a MEP identifier associated with the network device is included in the collection.

13. The network device of claim 11, wherein the control unit enables network traffic communication from the network device to the second network device after the MEP software determines that bidirectional connectivity exists between the network device and the second network device.

14. The network device of claim 11, wherein the indication is included in one or more type-length-value (TLV) fields of the extended continuity check message transmitted from the second network device.

15. The network device of claim 11,
wherein the control unit receives a subsequent extended continuity check message transmitted from the second network device after the MEP software determines that bidirectional connectivity exists between the network device and the second network device,
wherein the MEP module determines that bidirectional connectivity no longer exists between the network device and the second network device when an indication in the subsequent extended continuity check message transmitted from the second network device does not include the network device as one of the one or more network devices from which the second network device has received continuity check messages for the service instance; and wherein the control unit disables network traffic communication from the network device to the second network device after the MEP module determines that bidirectional connectivity no longer exists between the network device and the second network device.

16. The network device of claim 11, wherein the MEP software includes a MEP identifier associated with the second network device in a collection of MEP identifiers associated with network devices from which the network device has received continuity check messages for the service instance and generates an extended continuity check message associated with the network device that includes the collection of MEP identifiers in one or more type-length-value (TLV) fields, and wherein the control unit causes one of the plurality of physical network interfaces to transmit the extended continuity check message associated with the network device.

17. The network device of claim 16, wherein the MEP software removes the MEP identifier associated with the second network device from the collection of MEP identifiers after determining that bidirectional connectivity no longer exists between the network device and the second network device.

18. The network device of claim 17, wherein the MEP software removes one or more media access control (MAC) addresses that are reachable through the second network device from a collection of MAC addresses stored on the network device after determining that bidirectional connectivity no longer exists between the network device and the second network device.

19. The network device of claim 11,
wherein the control unit receives an extended continuity check message transmitted from a third network device,
wherein the MEP software determines that bidirectional connectivity does not exist between the network device and the third network device when an indication in the extended continuity check message transmitted from the third network device does not include the network device as one of the one or more network devices from which the third network device has received continuity check messages for the service instance; and
wherein the control unit disables network traffic communication from the network device to the third network device after the MEP software determines that bidirectional connectivity does not exist between the network device and the third network device.

20. The network device of claim 11, wherein the MEP software identifies a point of connectivity failure based at least in part on the indication.

21. A non-transitory computer-readable storage medium encoded with instructions that cause one or more programmable processors to:
monitor a layer two network with a first network device that operates within the network;
discover a second network device that operates within the network by receiving, with the first network device, an extended continuity check message transmitted from the second network device, wherein the extended continuity check message transmitted from the second network device indicates to other network devices that a service instance is available on the second network device, and wherein the extended continuity check message includes an indication of one or more network devices from which the second network device has received continuity check messages for the service instance; and
determine that bidirectional connectivity exists between the first network device and the second network device when the indication includes the first network device as one of the one or more network devices from which the second network device has received continuity check messages for the service instance.

22. The non-transitory computer-readable storage medium of claim 21, wherein the indication comprises a collection of maintenance association end point (MEP) identifiers associated with the one or more network devices from which the second network device has received continuity check messages for the service instance, and wherein bidirectional connectivity exists between the first network device and the second network device when a MEP identifier associated with the first network device is included in the collection.

23. The non-transitory computer-readable storage medium of claim 21, further encoded with instructions that cause one or more programmable processors to enable network traffic communication from the first network device to the second network device after determining that bidirectional connectivity exists between the first network device and the second network device.

24. The non-transitory computer-readable storage medium of claim 21, wherein the indication is included in one or more type-length-value (TLV) fields of the extended continuity check message transmitted from the second network device.

25. The non-transitory computer-readable storage medium of claim 21, further encoded with instructions that cause one or more programmable processors to:
receive, after determining that bidirectional connectivity exists between the first network device and the second network device, a subsequent extended continuity check message transmitted from the second network device;
determine that bidirectional connectivity no longer exists between the first network device and the second network device when an indication in the subsequent extended continuity check message transmitted from the second network device does not include the first network device as one of the one or more network devices from which the second network device has received continuity check messages for the service instance; and
after determining that bidirectional connectivity no longer exists between the first network device and the second network device, disable network traffic communication from the first network device to the second network device.

26. The non-transitory computer-readable storage medium of claim 21, further encoded with instructions that cause one or more programmable processors to:
after receiving the extended continuity check message transmitted from the second network device:
include a maintenance association end point (MEP) identifier associated with the second network device in a collection of MEP identifiers associated with network devices from which the first network device has received continuity check messages for the service instance;
generate an extended continuity check message associated with the first network device that includes the collection of MEP identifiers in one or more type-length-value (TLV) fields; and
transmit the extended continuity check message associated with the first network device from the first network device.

27. The non-transitory computer-readable storage medium of claim 26, further encoded with instructions that cause one or more programmable processors to remove the MEP identifier associated with the second network device from the collection of MEP identifiers after determining that bidirectional connectivity no longer exists between the first network device and the second network device.

28. The non-transitory computer-readable storage medium of claim 27, further encoded with instructions that cause one or more programmable processors to remove one or more media access control (MAC) addresses that are reachable through the second network device from a collection of MAC addresses stored on the first network device after determining that bidirectional connectivity no longer exists between the first network device and the second network device.

29. The non-transitory computer-readable storage medium of claim 21, further encoded with instructions that cause one or more programmable processors to:
receive an extended continuity check message transmitted from a third network device;
determine that bidirectional connectivity does not exist between the first network device and the third network device when an indication in the extended continuity check message transmitted from the third network device does not include the first network device as one of the one or more network devices from which the third network device has received continuity check messages for the service instance; and
after determining that bidirectional connectivity does not exist between the first network device and the third network device, disable network traffic communication from the first network device to the third network device.

30. The non-transitory computer-readable storage medium of claim 21, further encoded with instructions that cause one or more programmable processors to identify a point of connectivity failure based at least in part on the indication.

* * * * *